United States Patent
Dhawan et al.

(10) Patent No.: US 6,277,952 B1
(45) Date of Patent: Aug. 21, 2001

(54) DIRECT METHOD FOR PREPARING DOPED POLYANILINE, PRODUCT PREPARED THEREBY AND RESINOUS ARTICLES CONTAINING SAID PRODUCT

(75) Inventors: Sundeep Kumar Dhawan, Delhi (IN); David Ernest Rodrigues, Malta, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/440,186

(22) Filed: Nov. 15, 1999

(51) Int. Cl.[7] .................................................. C08F 6/12
(52) U.S. Cl. ..................... 528/486; 528/422; 528/491; 528/495; 528/499; 528/502 A; 525/191; 525/221; 525/230
(58) Field of Search ..................................... 528/486, 422, 528/491, 495, 499, 502 A; 525/230, 191, 221

(56) References Cited

U.S. PATENT DOCUMENTS 5,002,700 * 3/1991 Otagawa et al. ...................... 252/500
5,700,399 * 12/1997 Shimizu et al. ...................... 252/500

FOREIGN PATENT DOCUMENTS 9506685    3/1995  (WO) .

* cited by examiner

*Primary Examiner*—Duc Truong
(74) *Attorney, Agent, or Firm*—Donald S. Ingraham; Douglas E. Stoner

(57) ABSTRACT

Doped polyanilines are prepared by contacting aniline with an oxidizing agent such as ammonium peroxydisulfate in aqueous solution at a temperature of at most about 10° C. in the presence of at least one organic sulfonic acid, preferably an alkylbenzenesulfonic acid such as dodecylbenzenesulfonic acid. The products may be blended with thermoplastic resins such as polystyrene to produce blends having excellent static discharge properties.

5 Claims, No Drawings

DIRECT METHOD FOR PREPARING DOPED POLYANILINE, PRODUCT PREPARED THEREBY AND RESINOUS ARTICLES CONTAINING SAID PRODUCT

BACKGROUND OF THE INVENTION

This invention relates to conductive polymers, and more particularly to conductive doped polyanilines and compositions containing them The use of conductive materials as additives for plastics is of considerable interest since increased conductivity is desirable for many applications, including electrostatic painting and dissipation of static charges. For the latter purpose, especially, a very short static decay time, on the order of 0.02 second, is desirable.

Among the conductive additives which have been employed are conductive carbon black and conductive carbon fiber. At high loadings, however, carbon black tends to accumulate at the surface of a plastic part and subsequently slough off the plastic part. Carbon fiber is expensive and can decrease impact resistance of the part.

It is also possible to coat the surfaces of particulate non-conductive fillers such as mica, glass fibers or glass spheres with a conductive metal or compound thereof such as copper, silver or antimony-doped tin oxide. This, however, can cause problems including high cost, insufficient adhesion to the base resin and loss in conductivity as a result of oxidation of the metal coating.

Many of these problems can be alleviated by employing a conductive polymer as the additive. A particularly advantageous conductive polymer is polyaniline, which may be prepared by electrochemical methods or chemically by the oxidation of aniline in the presence of a mineral acid under relatively mild conditions.

These preparation methods typically afford the polyaniline as a partially oxidized and partially reduced material, with the reduced portion comprising —$C_6H_4NH$— structural units and the oxidized portion comprising alternating quinone and phenylene moieties separated by trivalent nitrogen atoms. This partially oxidized and partially reduced polyaniline is known as "emeraldine". It can be readily converted to the fully oxidized state, known as "pernigraniline", or to the fully reduced state, known as "leucoemeraldine". It can also be handled in the protonated state, known as "protonated emeraldine".

Polyaniline prepared by known methods, including the above-described chemical method, has, however, various problems which detract from its utility as a conductive polymer. As a single example of such a problem, such polyaniline is often contaminated with by-products such as the virulently carcinogenic benzidine.

PCT application 95/06,685 provides a summary of the state of the art of conductive polyaniline production and processing as of 1994, including the doping of polyaniline with such materials as alkylbenzenesulfonic acids. It also discloses a process in which doped polyaniline is combined with a polymer and a "solvent-plasticizer" to form a processable composition. Such a process requires a first step of preparing the polyaniline, a second step of doping it and a third step of combining the doped material with a polymer and a solvent-plasticizer.

It remains of interest, therefore, to prepare a polyaniline which is not contaminated with harmful by-products and which can be prepared in a minimum of steps and then blended with plastic materials to produce a processable conductive material.

SUMMARY OF THE INVENTION

The present invention provides a single-step direct method for preparing doped polyaniline and a method for separating the product from the reaction system I which it was prepared. The product of said method is benzidine-free and has a static decay time which is substantially shorter than that of doped polyaniline prepared by other methods. Said product can be combined in a single blending operation with thermoplastic polymers to afford processable conductive resinous compositions.

In one of its aspects, the invention is a method for preparing an electrically conductive polyaniline which comprises contacting aniline with an oxidizing agent in aqueous solution at a temperature of at most about 10° C. in the presence of at least one organic sulfonic acid. Another aspect of the invention is sulfonic acid-doped polyanilines prepared by this method.

A further aspect is conductive resinous compositions comprising at least one thermoplastic resin and the sulfonic acid-doped polyaniline.

A still further aspect is a method of isolating polyaniline doped with at least one organic sulfonic acid which comprises precipitating said doped polyaniline from aqueous solution by combination with a mixture of water and a $C_{1-4}$ water-miscible alkanol and separating the precipitated polyaniline from said solution.

DETAILED DESCRIPTION; PREFERRED EMBODIMENTS

In the method of the invention for polyaniline preparation, aniline is contacted with an oxidizing agent suitable for its conversion to polyaniline. Suitable oxidizing agents are, in general, mild ones and their identities are known in the art. The preferred oxidizing agent, for most purposes, is ammonium peroxydisulfate, $(NH_4)_2S_2O_8$.

Also employed is at least one organic sulfonic acid. It may be an aliphatic, aromatic or heterocyclic sulfonic acid; illustrative acids are methanesulfonic acid, benzenesulfonic acid, p-toluenesulfonic acid, 3-carboxy-4-hydroxybenzenesulfonic acid and 8-hydroxyquinoline-5-sulfonic acid. The preferred acids are the alkylbenzenesulfonic acids, most preferably those in which the alkyl groups contain about 4–20 carbon atoms; examples are 2-n-octylbenzenesulfonic acid and 4-n-dodecylbenzenesulfonic acid, the latter often being especially preferred.

Polyaniline preparation is effected by simply bringing the aniline into contact with the oxidizing agent and sulfonic acid at a temperature of at most about 10° C. at which the oxidation reaction takes place, the preferred temperature range being about 0–10° C. An aqueous medium is preferred. When the oxidizing agent is a peroxydisulfate such as ammonium peroxydisulfate, it is used in at least an equimolar amount with respect to the aniline, preferably in a molar ratio in the range of about 1.0–1.2:1. The sulfonic acid is preferably used in the amount of about 5–10 ml per gram of aniline. Most often, the oxidizing agent is added gradually or portionwise to a mixture of water, aniline and sulfonic acid, and the resulting mixture is agitated to facilitate polyaniline formation.

The polyaniline obtained according to the invention is already doped with sulfonic acid and is generally in the form of a suspension in the aqueous medium, said suspension being difficult to filter since the polyaniline particles tend to clog filters of pore size less than about 200 microns or pass through filters with larger pore sizes. According to the polyaniline isolation method of the invention, the suspension is combined with a mixture of water and a $C_{1-4}$ water-miscible alkanol such as methanol, ethanol, 1-propanol, 2-propanol or 2-methyl-2-propanol. The preferred alkanol in most instances is 2-propanol, by reason of its particular suitability, availability and low cost.

Combination of the aqueous reaction mixture with the alkanol-water mixture is ordinarily effected under ambient conditions including temperatures in the range of about 20–30° C. Said alkanol-water mixture typically contains an amount up to about 95% by weight water with the balance being alkanol. Upon such combination, the doped polyaniline precipitates as a fine powder which may be easily removed by filtration. After drying, typically in vacuum, it is ready for use.

The entire process of polyaniline preparation and isolation according to the invention is most often completed in a period of 6–8 hours. This is in contrast to the prior art method employing a mineral acid, which may require up to 10 hours for completion.

Sulfonic acid-doped polyanilines prepared and, preferably, isolated by the method of this invention are conductive and may be used in the same way as other conductive polymers. In particular, it may be employed to form a conductive coating on fillers and reinforcing agents of high aspect ratio, such as glass fibers, which may then be incorporated in thermoplastic resins to increase their conductivity.

The doped polyaniline may also be used directly as a conductive additive for thermoplastic resins. Illustrative resins include addition polymers, exemplified by olefin polymers such as polyethylene and polypropylene; diene polymers such as polybutadiene, polyisoprene, high impact styrene-diene copolymers and acrylonitrile-butadiene-styrene copolymers; alkenylaromatic polymers other than diene polymers, such as homo- and copolystyrenes; vinyl halide polymers; vinyl ester and alcohol polymers; acrylic polymers including polyacrylonitrile, polyacrylamide and poly(alkyl acrylates) and poly(alkyl methacrylates) such as poly(methyl methacrylate). Also included are condensation polymers, exemplified by polycarbonates such as bisphenol A polycarbonate, polyesters such as poly(ethylene terephthalate) and poly(1,4-butylene terephthalate); polyphenylene ethers such as poly(2,6-dimethyl-1,4-phenylene ether); polyarylene sulfides; polyetherimides such as the condensation product of 2,2-bis[4-(3,4-dicarboxyphenoxy)phenyl]propane dianhydride with at least one of p- and m-phenylenediamine; and polyethersulfones. For many purposes, polystyrene is a preferred thermoplastic resin. The resinous blends of the invention most often contain about 60–99% by weight of the thermoplastic resin and correspondingly about 1–40% of the doped polyaniline.

The invention is illustrated by the following examples.

EXAMPLE 1

A beaker was charged with 3,000 ml of water, 18.2 g of aniline and 90 ml of dodecylbenzenesulfonic acid. The mixture was cooled in an ice bath to 10° C. and a solution of 45.2 g of ammonium peroxydisulfate in 200 ml of water was added dropwise over 1.5 hours, with stirring. The reaction mixture was stirred for about 7 hours.

The product was an aqueous suspension of dodecylbenzenesulfonic acid-doped polyaniline which was found by gas chromatography-mass spectroscopy to be free from benzidine. By contrast, a control polyaniline reaction mixture prepared similarly using hydrochloric acid in place of the sulfonic acid was found to contain a trace of benzidine.

EXAMPLE 2

A 400-g portion of the aqueous polyaniline suspension prepared in Example 1 was mixed with 400 g of water and 400 g of 2-propanol. A precipitate formed which was easily removable from the aqueous medium by filtration through a filter with 1-micron pores. The filtration residue was the desired dodecylbenzenesulfonic acid-doped polyaniline (11.11 g).

EXAMPLES 3–5

Blends of dodecylbenzenesulfonic acid-doped polyaniline, prepared and isolated by the method of Examples 1–2, and a commercially available polystyrene were prepared by mixing the resins in a Brabender mixer at 220° C. for 5 minutes. The static decay times of the resulting blend samples were determined by applying 5,000-volt positive charges thereto and measuring the time required for the charge to decrease to 500 volts. Three applications of positive charge were made to each sample at 5-second intervals, followed by three similar applications of negative charge.

The average positive and negative charge dissipation times for each sample are reported in the following table. Comparison is made with two controls similarly prepared from the control polyaniline of Example 1; i.e., the polyaniline prepared using hydrochloric acid and subsequently doped with dodecylbenzenesulfonic acid.

| Example | Polystyrene, % | Polyanailine, % | Avg. positive dissipation time, V | Avg. negative dissipation time, V |
|---|---|---|---|---|
| 1 | 98 | 2 | 0.02 | 0.02 |
| 2 | 95 | 5 | 0.01 | 0.01 |
| 3 | 90 | 10 | 0.01 | 0.01 |
| Control 1 | 98 | 2 | 6.56 | 2.37 |
| Control 2 | 95 | 5 | 6.29 | 2.40 |

The results in the table clearly demonstrate the superior conductivity of the doped polyaniline prepared by the method of the invention, as compared with polyaniline prepared conventionally and subsequently doped.

What is claimed is:

1. A method of isolating polyaniline doped with at least one organic sulfonic acid which comprises precipitating said doped polyaniline from aqueous solution by combination with a mixture of water and a $C_{1-4}$ water-miscible alkanol and separating the precipitated polyaniline from said solution.

2. A method according to claim 1 wherein the alkanol-water mixture contains an amount up to about 95% by weight water with the balance being alkanol.

3. A method according to claim 1 wherein the sulfonic acid is an alkylbenzenesulfonic acid.

4. A method according to claim 3 wherein the alkylbenzenesulfonic acid is dodecylbenzenesulfonic acid.

5. A method according to claim 1 wherein the alkanol is 2-propanol.

* * * * *